F. W. WEEKS.
CINEMATOGRAPH TARGET APPARATUS.
APPLICATION FILED NOV. 26, 1915.

1,197,567.

Patented Sept. 5, 1916.
2 SHEETS—SHEET 2.

Frank W. Weeks Inventor
By his Attorney
Frank P. Wentworth

UNITED STATES PATENT OFFICE.

FRANK W. WEEKS, OF NEW YORK, N. Y., ASSIGNOR TO LYDIA B. KOCH, OF NEW YORK, N. Y.

CINEMATOGRAPH TARGET APPARATUS.

1,197,567. Specification of Letters Patent. Patented Sept. 5, 1916.

Application filed November 26, 1915. Serial No. 63,417.

*To all whom it may concern:*

Be it known that I, FRANK W. WEEKS, a citizen of the United States, residing in the borough of Manhattan, in the city, county, and State of New York, have invented certain new and useful Improvements in Cinematograph Target Apparatus, of which the following is a specification, reference being had therein to the accompanying drawings, which form a part thereof.

My invention relates to cinematograph target apparatus and more particularly to a type thereof wherein the projector is stopped substantially simultaneously with the impact of the bullet with the target, to change the moving picture to a still picture, and thus allow the marker to determine the accuracy of the aim of the marksman.

Targets of the particular class to which my invention relates, have been heretofore suggested, the purpose of these targets being to present to the marksman a moving object to be fired upon, which object will approximate in size, outline and character and speed of movement, the particular object in connection with which the marksman requires practice. With targets of this character, it is possible to portray with reasonable accuracy battle scenes; men and armies in motion, animals and birds under natural conditions; and burglars, foot-pads and other criminals at work with surroundings and conditions such as might naturally be anticipated. If the target be used merely for purposes of amusement instead of as a target for drilling marksmen, the character of the images projected may be varied to make the pastime more amusing.

In targets of the general type to which my invention relates, the screen upon which the image is projected is composed of a sheet through which the bullet passes thus causing rays of light from illuminating agencies behind the screen to project through the bullet hole and illuminate the point of impact of the bullet, the projector being made inoperative substantially simultaneously with the discharge of the firearm to cause the image upon the screen to remain in a fixed position in order to determine the point of impact of the bullet with relation to the image fired at, at the time of such impact.

By my present invention, I am enabled to provide a target of the character referred to, wherein the screen arrangement will be such as to permit the record of a hit by the illumination of the bullet opening while causing said light rays to be automatically interrupted immediately thereafter; affording, however, sufficient time for the marksman to determine the accuracy of his fire and the marker to make a record of the same in the event that the target is being used in a contest. This result is secured by means of a continuous, substantially opaque web having two reaches traveling in close juxtaposition in substantially parallel planes in a manner to avoid the register of old bullet holes in a manner to make a false record of a hit. By providing a sight opening, the dimensions of which are relatively smaller than the areas of the parallel reaches of the web, I not only minimize the likelihood of the making of a false record in this manner, but permit of the adaptation in the device, of a hood projecting forwardly of said sight opening in a manner to give a shadow box effect to accentuate the tones of the images projected upon the screen and permit the use of the target notwithstanding the presence of light in the immediate locality of the target.

To cause the stoppage of the projector substantially simultaneously with the passage of the bullet through the screen, and its backing strip, I provide a back guard for said screen so arranged that the impact of the bullet therewith will displace said guard in a manner to cause it to actuate the mechanism controlling a switch in the circuit to the motor driving the said projector. In conjunction with this mechanism I preferably use means whereby immediately following the interruption of the current to the motor of the projector, said mechanism will be actuated in a manner to restore the shield or back plate to its normal position preparatory to a succeeding shot at the target. I also provide in conjunction with this mechanism, a registering device whereby each shot which hits the target will actuate said mechanism to permit the number of hits to be automatically registered or to indicate the cash receipts in case any charge made for the use of the target be based upon the number of shots fired. While I preferably provide means for automatically restoring the shields or backing plates of the target to normal, immediately following the opening of the circuit to the projector, I also provide means whereby this means may be made inoperative so that the image upon the screen may be held stationary as long as the operator may desire. When the automatic restoring means is used, it will be observed that the impact of the bullet with the shield, or back plate, will successively cause the interruption of the circuit to the motor actuating the projector; and the closing of the circuit to the means for restoring the shields or back plates to their normal position; and that substantially simultaneously with the restoration of the shields or back plates to normal, this automatic restoring means will again close the circuit to the projector so as to change the still image to a moving one.

The shield or back plate is so constructed that irrespective of the point of impact of the bullet therewith the force of the blow will have substantially the same operative effect in setting said back plate in motion for the purpose of actuating the switch controlling mechanism, this construction being made necessary because of the low muzzle velocity of the projectile or bullet when firearms are used for target purposes. While, when the target is in use the web forming the screen has continuous travel imparted thereto, it is desirable to provide means controlling the actuating mechanism for moving said web so that if desired movement of the web may be arrested as when it is desired to record the hole formed by the bullet in the screen and the backing strip thereafter for the purpose of a better inspection of the target. This web is so positioned with relation to the sight opening of the target, that the edges thereof are protected from the bullet fired at the target in a manner to preserve the continuity of the web forming the screen and the backing therefor, along both edges, thus avoiding likelihood of the tearing of the web by the stresses thereon from the feeding mechanism, and permitting the screen to be held sufficiently taut.

An incidental object of my invention is to so construct the target as to make it readily portable and permit the assembling of the various elements entering into the target or the taking down of the target even by unskilled labor.

The invention consists in the novel features of construction and combination of parts hereinafter set forth and described and more particularly pointed out in the claims hereto appended.

Referring to the drawings.

Like letters refer to like parts throughout the several views.

Figures 1, 4:
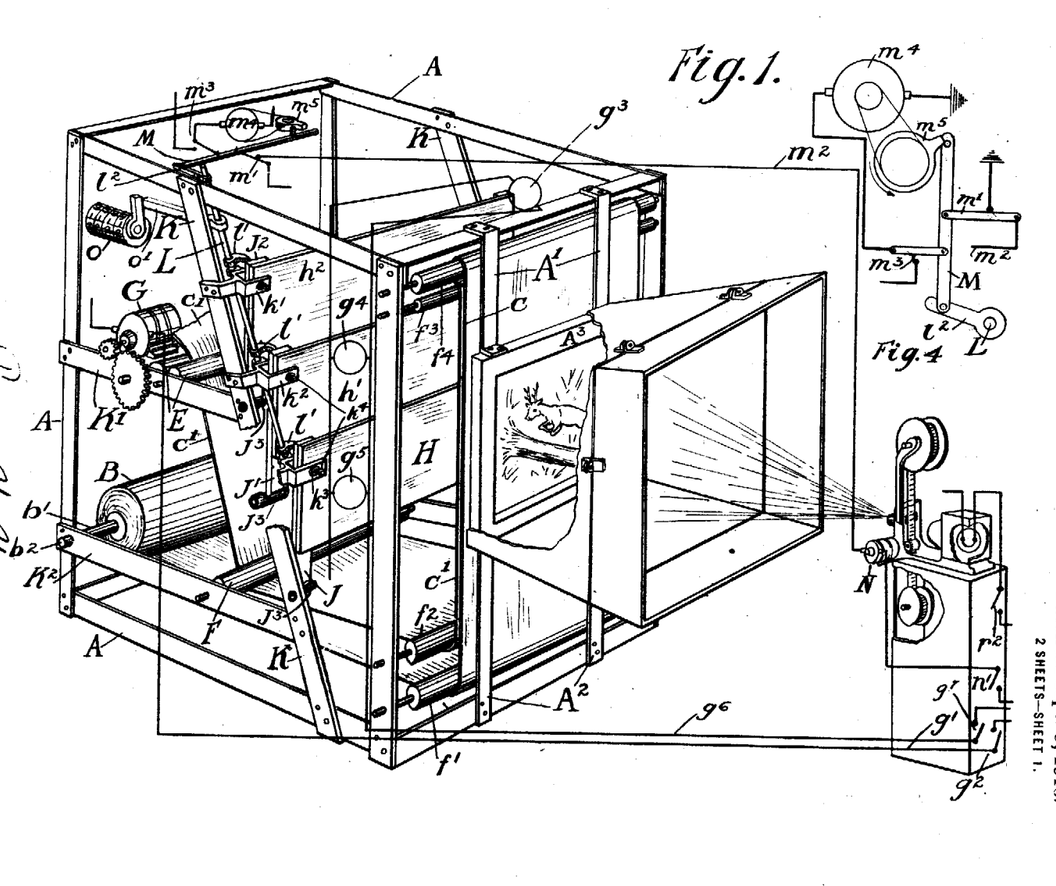
—Figure 1 is a perspective view of a target embodying my invention, parts thereof being broken away.
Fig. 4 is a detail view of the switch controlling mechanism by means of which the circuit to the projector and the circuit to the means for restoring the shield or back plates, and automatically closing the circuit to the projector, are controlled.

In the embodiment of my invention shown in the accompanying drawings, the main frame of the apparatus supporting all of the working parts is indicated at A. This frame is preferably made in rectangular form, of metal bars so connected as to secure the desired rigidity of the frame and provide the desired clearance within the frame for the working parts of the apparatus. This construction of the frame not only permits compactness and lightness in the structure, but protects the working parts and facilitates the packing of the apparatus. Upon the front of this frame, I provide two brackets extending respectively from the top, and the bottom of the frame A, the top brackets being indicated at A', and the bottom at $A^2$. Carried by said brackets is a rectangular frame $A^3$ forming a sight opening through which the images are projected upon the screen.

Extending from each bottom side bar of the frame A in an upward incline, to each top side bar thereof are braces K, extending from which to the rear vertical upright of the frame are the horizontal bars K' and $K^2$, this construction being duplicated upon each side of the apparatus. Mounted in suitable bearings $b^2$ in the bars $K^2$ is a spindle $b'$, having mounted thereon a paper roll or web B, which forms both the screen and the backing strip therefor. Carried by the bar K' are a pair of feeding rollers E, by means of which the paper web is drawn from the roll B by a continuous, substantially uniform traveling movement across the sight opening in the frame $A^3$, guide rollers $f'$—$f^2$—$f^3$—$f^4$ and F being provided for defining the path of said web. The rollers $f'$ and $f^4$ are substantially parallel, and are of the same diameter, one being arranged toward the bottom, and the other toward the top, of the front of the frame A, and the rollers $f^3$—$f^4$ are set back slightly with relation to said rollers $f'$ and $f^4$ so as to space the return reach of the web slightly away from the front or screen reach thereof. To simplify the description of the apparatus I have indicated the front or screen reach of the web by the reference letter C, and the rear or backing strip reach by the reference letter C'.

The arrangement of guide rollers and the construction of the bearing $b^2$ are such as to secure the desired tautness throughout the web, although any other desired drag upon the spindle $b'$ may be used without departing from my invention.

The feed rollers E are adapted to be continuously rotated by means of the electric motor G, geared in any desired manner to said rollers, and receiving its power from the electric circuit $g'$ having a switch $g^2$ therein adjacent the projector so as to place this motor always within the control of the operator. The connection between the motor G and the feed rollers is so proportioned as to impart very slow movement to the screen in order to insure the illumination of bullet holes through the sections C and C' of the screen for a sufficient interval to permit the marksman or the marker to determine the point of impact of the bullet with the section C.

The switch $g^2$ controlling the circuit $g'$ is designed to permit the stoppage of the screen strip at any time that it may be desired to more accurately ascertain the impact point of the bullet. It will be observed, however, that the actuation of the screen is entirely independent of the automatic control of the projector; which will be referred to hereinafter.

Back of the guide rollers $f'$—$f^2$—$f^3$—$f^4$ and within the frame A, I provide a plurality of illuminating devices, as incandescent lamps $g^3$—$g^4$—$g^5$ contained in the electric circuit $g^6$ having therein a switch $g^7$ adjacent the projector. By locating these lamps beyond the outer edges of the frame $A^3$, the desired illuminating effect may be secured and these lamps will be without the range of the marksman, since at no angle of fire or deflection could a bullet hit these lamps after passing through the screen.

To prevent a tearing of the edges of the paper web B, I make this web of a width to extend beyond the sides of the frame $A^3$, thus protecting this edge from bullets and preserving the full strength of the paper web along both edges thereof in a manner to insure a continuous feeding movement thereof. This arrangement is of importance as otherwise longitudinal stresses on the paper from the feed rollers, would have a tendency to tear the paper laterally thereof in the event of a break or tear in either edge. In targets of this character, the mark is projected upon the screen reach, or section, C by means of a motor actuated projector O, so situated as not to be within the range of the marksman. When the target is hit, to determine the accuracy of the fire, it is necessary to arrest the operation of the projector O, so that the image will remain still instead of being subjected to the constant apparent movement resulting from the operations of said projector. In the apparatus of my invention, I secure this result by automatically interrupting the circuit to the motor of the projector substantially simultaneously with the impact of a bullet with, or its passage through, the screen. In the form of the invention shown, the motor for actuating the film mechanism of the projector, indicated at N is actuated through the circuit $m^2$. This circuit has therein two switches, an automatically actuated switch $m'$ and a manually operative switch $n'$ adjacent the projector, the latter switch being provided merely as a controlling means for stopping and starting the projector irrespective of any registering of a hit upon the target. In other words, the switch $n'$ is a switch ordinarily used in motor driven projectors for stopping and starting the projector.

The switch $m'$, shown merely conventionally in the drawings, may take any desired or approved form, this switch being positively operated by purely mechanical means substantially simultaneously with the impact of a bullet with, or its passage through the screen upon which the image is projected. In conjunction with this switch actuating mechanism, I provide means whereby after a brief interval sufficient to allow the hit to be registered by means of the illuminated openings in the screen section C, and backing C', said switch may be again closed so as to again set the projector in motion preparatory to a succeeding shot. This restoring means is also used to reset the mechanism controlling the circuit $m^2$ by means of the said switch $m'$.

The actuating means for the switch controlling the circuit to the projector motor comprises, in the form of the invention shown a shield or back plate arranged rearwardly of the screen C, and backing strip C', adapted to have movement upon the impact of a bullet therewith, this movement being transmitted by an intermediate mechanism to the switch $m'$. In the form of the invention shown this shield or back plate comprises a plurality of independently operative weighted sections H—$h'$—$h^2$ so mounted at the bottom thereof as to permit each of them to be unseated by the force of a very light impact of a bullet therewith. These sections overlap each other as shown, to avoid the impact of a bullet with a portion of any of said plates sufficiently close to its point of pivotal support to involve any likelihood of the force of the impact being insufficient to overbalance the plate. By employing a plurality of such sections, I provide an extended area throughout which the same force of impact will have substantially the same operative effect upon the shield or back plate. Each of the sections H—$h'$—$h^2$ is provided with bearing extensions J—$J'$—$J^2$, the lower edge of each of which is brought to a knife edge and seated in suitable supports $J^3$ carried by the braces K. These supports $J^3$ are so constructed as to straddle said extensions to prevent a displacement of the extension, while permitting a free oscillation of the sections H—$h'$—$h^2$. Preferably these supports are tubular members cut away longitudinally of the tube to an extent to secure the desired clearance for the movements of the extensions J—$J'$—$J^2$ respectively. Also carried by the braces K adjacent the top of each of said sections H—$h'$—$h^2$ respectively, are brackets $k^3$—$k^2$—$k'$, the arms of which straddle said sections and define the maximum oscillatory movement thereof. Preferably I provide the forward arm of each of said brackets with an adjustment screw, as $k^4$, by means of which the said plates may be set, or balanced, in a position which will permit their being overbalanced by an impact of any desired force.

Rotatably mounted in bearings carried by one of the braces K, is a rotatable shaft L having a plurality of tappets or cranks $l'$ projected in the path of movement of each of the shield or back plate sections H—$h'$—$h^2$, so that a rearward oscillation of any of said sections will rotate said shaft, and a reverse rotation of said shaft, will restore any said section to its vertical or balanced position.

Mounted upon the frame A is a lever M, pivoted at one end, the free end thereof being projected within the operative range of a cam or crank arm $l^2$ carried by the shaft L. The lever M is operatively connected with the switch $m'$. The circuit to the projector is also closed, and the sections H—$h'$—$h^2$ or any of them is restored to normal, by means of this lever M. When I desire to make the closing of the circuit $m^2$ and the return of the sections H—$h'$—$h^2$ to normal entirely automatic, I provide electrically actuated means operative upon the said lever for restoring it to its normal position, and in addition thereto a circuit for this automatic restoring means, controlled by a switch $m^3$ operative connected with the said lever M, in a manner to insure the closing of its circuit by the switch $m^3$ immediately following the opening of the circuit controlled by the switch $m'$. In the accompanying drawings, this restoring means is shown conventionally as a motor $m^4$ operating a cam $m^5$ acting upon the lever M, although any desired electrically actuated means may be substituted therefor with the same operative effect. The mechanical controlling means for the switch in the circuit to the projector may also be utilized for registering the number of hits, by providing an ordinary counting machine $o$, the impact arm of which is adapted to be engaged by a tappet $o'$ carried by the shaft $l$.

Figure 3:
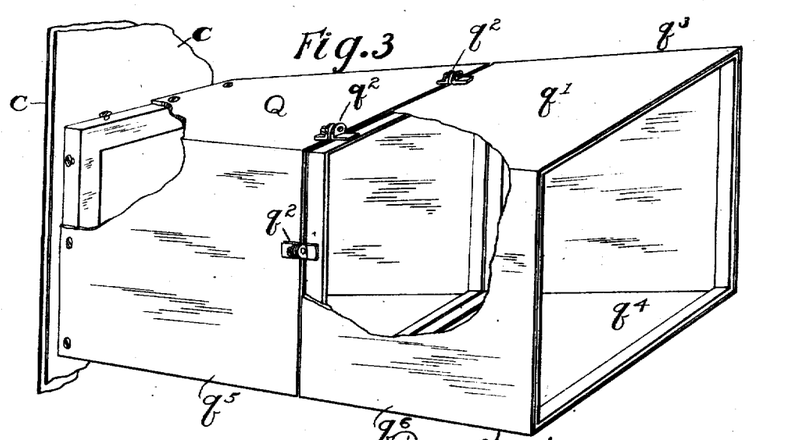
Fig. 3 is a perspective view of the hood or shadow box partly broken away.

The hood or shadow box projecting from the frame $A^3$, in addition to its structural features, is adapted to exclude a sufficient volume of light about the apparatus from the portion of the screen upon which the light is projected, to insure clearly defined tones in the images projected upon the screen. Said hood or shadow box is so constructed as to permit the projection of the images upon the screen at an angle to the longitudinal axis of the apparatus, so that the projector may be positioned without the range of those shooting at the target, as well as to permit marksmen to shoot at the target at different angles. This hood or shadow box is composed of a plurality of detachably connected sections, the smallest of which, Q is adapted to be attached to the frame $A^3$ by means of screws or in any other desired manner, which will facilitate the quick application or removal of the section from the said frame. Succeeding sections as $q'$ are attached to the section nearer the said frame, by means of lugs and bolts $q^2$ or in any other desired manner. Each of the sections Q—$q'$ comprises end frames carrying a suitable metal sheathing. Preferably the top $q^3$ and bottom $q^4$ of each section are parallel and horizontal while the opposite sides $q^5$—$q^6$ of each section diverge from one end toward the other, the degree of angularity of said sides of different sections being the same so as to provide continuous diverging side walls leading outwardly from the frame $A^3$. Any number of these sections may be employed.

Any desired form of projector may be used for projecting the images upon the screen surface C. In Fig. 1 I have shown one form of projector but in Fig. 2 I have shown the form of projector I prefer to use. The light for this projector is derived from an incandescent lamp R arranged in the circuit $R'$. This circuit has therein a switch $R^2$ carried by the projector housing, so as to place the light at all times within the control of the operator. The motor N is of a universal type adapted for both AC and DC currents. The film reels and the rewinding reels are located within the housing of the projector, the film passing through the openings $r^4$—$r^5$ to said reels. The preferred form of projector employs a rotary shutter and as when the projector is stopped by the impact of the bullet with, or its passage through, the screen, the purpose is to change the moving picture to a still picture, it is essential that the shutter be held open upon the stoppage of the motor N. To effect this, I use a governor apparatus S, the detailed construction of which it is not my intention to claim in this application, such being made the subject matter of a further application filed simultaneously herewith. Considering the invention in its broader aspects, the type of projector used is immaterial to the invention as long as it be susceptible of being automatically stopped in the manner herein described.

The operation of the herein described apparatus is substantially as follows: When the target is in use, the feeding rollers EE are continuously driven by the motor G to draw the web or strip from the roll B and cause it to travel continuously through the apparatus at a substantially uniform rate, the reaches C—C' of the web or strip, at the front of the apparatus, having simultaneous movement in opposite directions. At the same time, the projector O is being actuated by the motor N to project moving pictures upon the portion of the front or screen reach of said web passing the sight opening in the frame $A^3$. The hood or shadow box extending from adjacent the said frame toward said projector will exclude such light rays from about said sight opening as would interfere with the desired tone contrasts or sharp outlines of the images projected upon the portion C of the web within said frame $A^3$. The circuit to the lamps $g^3$—$g^4$—$g^5$ is always closed while the apparatus is in use so as to have constant illumination rearwardly of the vertical reaches C—C' of the said web, the interposition of the rear or backing strip reach C' between the lamps and the front or screen reach C in large measure preventing the light from interfering with the tone values of the images projected on the latter. With the apparatus in operation as above described, the switches $m'$—$g^2$—$g^7$ $n'$ and $r^2$ will all be closed and the switch $m^3$ will be opened. If a gun, pistol or other firearm of small caliber be discharged at the moving image, and the bullet strikes the portion of the moving screen within the frame $A^3$, or intermediate the upper and lower guide rollers, said bullet will substantially instantly pass through both reaches C and C' of the web from the roll B, making fairly clearly defined, alined openings through which the light from the lamps $g^3$—$g^4$—$g^5$ or other illuminating means, will pass, clearly marking the point of impact of the bullet with the reach C without, however, arresting the movement or travel of the web. Substantially simultaneously with the passage of the bullet through the reach C—C' of said web, the said bullet will impact with one of the shield or back plate sections H—$h'$—$h^2$, and through the force of this impact, impart sufficient initial movement to said section to overbalance it, said section having subsequent movement due mainly to its weight, to develop sufficient force, independently of the force of impact of the bullet therewith to exert the required amount of force upon the tappet or crank $l'$ adjacent said section, to actuate the rod L. The rearward arm of the fork $k'$—$k^2$ or $k^3$ straddling the edges of the section thus moved, will limit the rearward oscillation of said section, but not until it has rotated the shaft L sufficiently to cause the cam or crank arm $l^2$ to oscillate the lever M and open the switch $m'$, the opening of which will open the circuit $m^2$ and substantially instantly stop the motor N and the feed of the film thereby, changing the image projected upon the screen reach C from a moving to a still picture. All of these operations will occur substantially instantaneously with the impact of the bullet with the target, so that as the image becomes still, the point of impact of the bullet, indicated by the bright light passing through the holes in the reaches C—C' relatively to the object aimed at, will be clearly discernible. The bullet holes in the reaches C—C' will slowly pass out of register, however, by reason of the continued travel of the reaches C—C' of the web in opposite directions, but the slow rate of traverse of the web, will allow them to remain in substantial alinement for a sufficient interval to enable the marksman or marker to determine the accuracy of aim of the former. If for any reason, it be desired to prolong this interval, the switch $g^2$ may be actuated to open the circuit $g'$ and arrest the travel of the web, and when an automatic restoring mechanism is used, the switch $n'$ may be simultaneously actuated to open the circuit to the motor N. Simultaneously with the opening of the switch $m'$ the crank arm $o'$ will actuate the counter O when a registering mechanism is used upon the apparatus.

By positioning the frame $A^3$ intermediate the top and bottom guide rollers $f'$—$f^4$, I cause the punctured portions of the web to travel a sufficient distance to avoid likelihood of the registering of old bullet holes in any portion of the reach C of the web, with old bullet holes in the portion of said web which has passed from the front C to the rear reach C'. This, however, is of minor importance, as with a target of this type, likelihood of two bullets striking within a short interval on substantially the same vertical line is remote.

When the automatic restoring mechanism is used, the movement of the lever M will successively open the switch $m'$ and close the switch $m^3$, the closing of the latter switch, causing the actuation of the motor $m^4$ and cam $m^5$, or other equivalent electro-receptive device, to restore said lever M, shaft L and sections H—$h'$—$h^2$ to normal, and at the same time, again close the switch $m'$ to cause the projector O to again function to project a moving picture or image upon the screen. The brief interval which elapses between the opening of the switch $m'$ and the closing thereof, should be so timed as to approximate the interval required by the movement of the web to bring the alined bullet openings in the reaches C—C' out of register.

Figure 2:
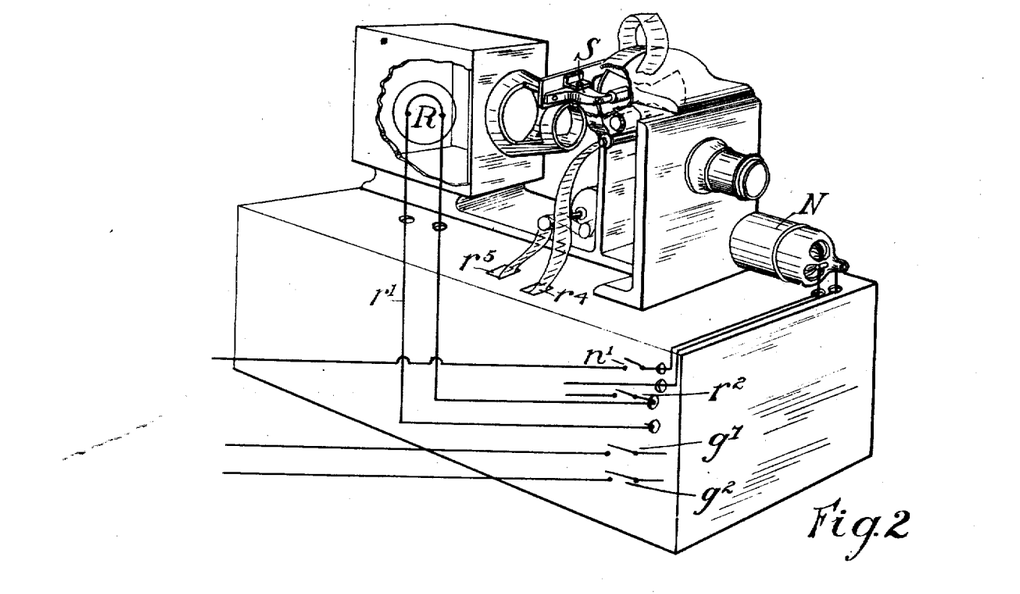
Fig. 2 is a detail view of the preferred form of projector illustrating conventionally the wiring thereof.

The shield or back plate sections H—h'—h² in addition to serving as a means through which the impact of the bullet will stop the projector, serve as a protection for the parts of the apparatus positioned rearwardly thereof, this shield or back plate being located intermediate said parts and the face of the target. The governor apparatus S insures the shutter of the projector always remaining open when the circuit to the motor N is opened.

When the apparatus is in use, the frame A may be inclosed, or housed in any desired manner to conceal the mechanism carried thereby.

It is not my intention to limit the invention to the precise details of construction shown in the accompanying drawings, and herein described, it being apparent that such may be varied without departing from the spirit and scope of my invention.

Having described the invention what I claim as new and desire to have protected by Letters Patent is:—

1. A cinematograph target apparatus embodying therein a roll support, a roll of continuous web or strip carried by said support, feeding means for drawing said web or strip from said roll through the apparatus, a plurality of guides whereby said web or strip is caused to pass the front of the apparatus in substantially parallel, adjacent reaches, the front reach forming a screen surface and the rearward reach forming a backing strip for said front reach, illuminating means rearwardly of said guides whereby the passage of a bullet through both said web reaches will permit the light from said means to indicate the point of impact of the bullet with the screen reach, means actuating said feeding means whereby continuous travel at a substantially uniform rate and in opposite directions is imparted to said web or strip reaches to cause the bullet openings therein respectively to be gradually and automatically moved out of register, a projector adapted to direct moving images upon said screen reach and means whereby, substantially simultaneously with the impact of the bullet with said web, said projector will be stopped to change the moving image to a still image.

2. A cinematograph target apparatus embodying therein a roll support, a roll of continuous web or strip carried by said support, feeding means for drawing said web or strip from said roll through the apparatus, a plurality of guides whereby said web or strip is caused to pass the front of the apparatus in substantially parallel, adjacent reaches, the front reach forming a screen surface and the rearward reach forming a backing strip for said front reach, illuminating means rearwardly of said guides whereby the passage of a bullet through both said web reaches will permit the light from said means to indicate the point of impact of the bullet with the screen reach, means actuating said feeding means whereby continuous travel at a substantially uniform rate and in opposite directions is imparted to said web or strip reaches to cause the bullet openings therein respectively to be gradually and automatically moved out of register, a projector adapted to direct moving images upon said screen reach, means whereby substantially simultaneously with the impact of the bullet with said web, said projector will be stopped to change the moving image to a still image, and automatically acting means whereby said projector is again made operative to direct moving images upon said screen reach after the lapse of a brief interval and substantially simultaneously with passing out of register of the openings through the screen and backing strip reaches.

3. A cinematograph target apparatus embodying therein a roll support, a roll of continuous web or strip carried by said support, feeding means for drawing said web or strip from said roll through the apparatus, a plurality of guides whereby said web or strip is caused to pass the front of the apparatus in substantially parallel, adjacent reaches, the front reach forming a screen surface and the rearward reach forming a backing strip for said front reach, a frame having a sight opening therein of a smaller vertical dimension than, and arranged in front, of said screen reach and intermediate said guides, illuminating means rearwardly of said guides whereby the passage of a bullet through both said web reaches will permit the light from said means to indicate the point of impact of the bullet with the screen reach, means actuating said feeding means whereby continuous travel at a substantially uniform rate and in opposite directions is imparted to said web or strip reaches to cause the bullet openings therein respectively to be gradually and automatically moved out of register, a projector adapted to direct moving images upon said screen reach, and means whereby, substantially simultaneously with the impact of the bullet with said web, said projector will be stopped to change the moving image to a still image.

4. A cinematograph target apparatus embodying therein a roll support, a roll of continuous web or strip carried by said support, feeding means for drawing said web or strip from said roll through the apparatus, a plurality of guides whereby said web or strip is caused to pass the front of the apparatus in substantially parallel, adjacent reaches, the front reach forming a screen surface and the rearward reach forming a backing strip for said front reach, a frame having a sight opening therein of smaller vertical and lateral dimensions than, and arranged in front of said screen reach, and intermediate said guides whereby tearing of the edges of said web or strip by bullets passing through said sight opening is prevented, illuminating means rearwardly of said guides whereby the passage of a bullet through both said web reaches will permit the light from said means to indicate the point of impact of the bullet with the screen reach, means actuating said feeding means whereby continuous travel at a substantially uniform rate and in opposite directions is imparted to said web or strip reaches to cause the bullet openings therein respectively, to be gradually and automatically moved out of register, a projector adapted to direct moving images upon said screen reach, and means whereby substantially simultaneously with the impact of the bullet with said web, said projector will be stopped to change the moving image to a still image.

5. A cinematograph target apparatus embodying therein a roll support, a roll of continuous web or strip carried by said support, feeding means for drawing said web or strip from said roll through the apparatus, a plurality of guides whereby said web or strip is caused to pass the front of the apparatus in substantially parallel, adjacent reaches, the front reach forming a screen surface and the rearward reach forming a backing strip for said front reach, a frame having a sight opening therein of a smaller vertical dimension than, and arranged in front of said screen reach and intermediate said guides, a hood or shadow box inclosing said frame and projecting forwardly thereof, illuminating means rearwardly of said guides whereby the passage of a bullet through both said web reaches will permit the light from said means to indicate the point of impact of the bullet with the screen reach, means actuating said feeding means whereby continuous travel at a substantially uniform rate and in opposite directions is imparted to said web or strip reaches to cause the bullet openings therein respectively to be gradually and automatically moved out of register, a projector adapted to direct moving images upon said screen reach, and means whereby, substantially simultaneously with the impact of the bullet with said web, said projector will be stopped to change the moving image to a still image.

6. A cinematograph target apparatus embodying therein a roll support, a roll of continuous web or strip carried by said support, feeling means for drawing said web or strip from said roll through the apparatus, a plurality of guides whereby said web or strip is caused to pass the front of the apparatus in substantially parallel, adjacent reaches, the front reach forming a screen surface and the rearward reach forming a backing strip for said front reach, a frame having a sight opening therein of a smaller vertical dimension than, and arranged in front of said screen reach and intermediate said guides, a hood or shadow box comprising a plurality of separable sections having closed diverging side walls and closed top and bottom walls, one of said sections being adapted to inclose and be connected with said frame, and another section being adapted to be connected to the edge of said first named section to form an extension thereof, illuminating means rearwardly of said guides whereby the passage of a bullet through both said web reaches will permit the light from said means to indicate the point of impact of the bullet with the screen reach, means actuating said feeding means whereby continuous travel at a substantially uniform rate and in opposite directions is imparted to said web or strip reaches to cause the bullet openings therein respectively to be gradually and automatically moved out of register, a projector adapted to direct moving images upon said screen reach, and means whereby substantially simultaneously with the impact of the bullet with said web, said projector will be stopped to change the moving image to a still image.

7. A cinematograph target apparatus embodying therein a screen, a projector adapted to direct moving images upon said screen, a physically movable shield or back plate positioned rearwardly of said screen, illuminating means arranged intermediate said shield or back plate and said screen whereby the passage of a bullet through said screen will permit light rays from said illuminating means to indicate the point of impact of a bullet with the screen, projector controlling means, and actuating means for said projector controlling means, arranged within the path of movement of said shield or back plate, said shield or back plate being so supported that it will receive an initial movement from the force of the impact of a bullet therewith and will have subsequent movement to develop sufficient force independently of the force of such impact to actuate said means whereby said projector will be stopped to change a moving image to a still image, substantially simultaneously with the impact of a bullet with the screen.

8. A cinematograph target apparatus embodying a screen, a projector adapted to direct moving images upon said screen, an electric circuit, an electrical switch therein, an electro-receptive device whereby said projector may be stopped, arranged in said circuit, a physically movable shield or back plate positioned rearwardly of said screen, illuminating means arranged intermediate said shield or back plate and said screen whereby the passage of a bullet through said screen will permit light rays from said illuminating means to indicate the point of impact of a bullet with the screen, movable means arranged within the path of movement of said shield or back plate, said shield or back plate being so supported that it will receive an initial movement from the force of the impact of a bullet therewith, and will have subsequent movement independently of the force of such impact to develop sufficient force to actuate said movable means and operative connections between said movable means and said switch whereby the circuit to said electro-receptive device will be opened to stop the projector and change the moving image to a still image, substantially simultaneously with the impact of a bullet with the screen.

9. A cinematograph target apparatus embodying therein a screen, a projector adapted to direct moving images upon said screen, an electric circuit, an electrical switch in said circuit, an electro-receptive device whereby said projector may be stopped, arranged in said circuit, a physically movable shield or back plate positioned rearwardly of said screen, illuminating means arranged intermediate said shield or back plate and said screen whereby the passage of a bullet through said screen will permit light rays from said illuminating means to indicate the point of impact of a bullet with the screen, a rotatable shaft, a tappet or crank carried thereby and projecting within the path of movement of said shield or back plate, said shield or back plate being so supported that it will receive an initial movement from the force of the impact of a bullet therewith and will have subsequent movement independently of the force of such impact to develop sufficient force to rotate said shaft and operative connections between said shaft and said switch whereby the circuit to said electro-receptive device will be opened to stop the projector and change the moving image to a still image, substantially simultaneously with the impact of a bullet with the screen.

10. A cinematograph target apparatus embodying therein a screen, a projector adapted to direct moving images upon said screen, a shield or back plate positioned rearwardly of said screen, comprising a plurality of independently movable sections, illuminating means arranged intermediate said shield or back plate and said screen whereby the passage of a bullet through said screen will permit light rays from said illuminating means to indicate the point of impact of a bullet with the screen, means whereby said projector may be controlled, actuating means for said projector controlling means common to all of the sections of said shield, and a plurality of means carried thereby and projected within the path of movement of said shield or back plate sections respectively, each of said sections being independently supported so that it will receive an initial movement from the force of the impact of a bullet therewith and will have subsequent movement independently of the force of such impact to develop sufficient force to actuate said actuating means, whereby said projector will be stopped to change the moving image to a still image substantially simultaneously with the impact of the bullet with the screen.

11. A cinematograph target apparatus embodying therein a screen, a projector adapted to direct moving images upon said screen, a shield or back plate positioned rearwardly of said screen, comprising a plurality of independently movable sections, illuminating means arranged intermediate said shield or back plate and said screen whereby the passage of a bullet through said screen will permit light rays from said illuminating means to indicate the point of impact of a bullet with the screen, means whereby said projector may be controlled, actuating means for said projector controlling means common to all of the sections of said screen, a plurality of means carried thereby and projected within the path of movement of said shield or back plate sections respectively, an extension projecting from the bottom of each of said sections having a narrow bearing surface and a recessed support for each of said extensions whereby it is independently supported so that it will receive an initial movement from the force of the impact of a bullet therewith and will have subsequent movement independently of the force of such impact to develop sufficient force to actuate said actuating means, whereby said projector will be stopped to change the moving image to a still image substantially simultaneously with the impact of a bullet with the screen.

12. A cinematograph target apparatus embodying therein a screen, a projector adapted to direct moving images upon said screen, a shield or back plate positioned rearwardly of said screen, comprising a plurality of independently movable sections, illuminating means arranged intermediate said shield or back plate and said screen whereby the passage of a bullet through said screen will permit light rays from said illuminating means to indicate the point of impact of a bullet with the screen, means whereby said projector may be controlled, actuating means for said projector, controlling means common to all the sections of said screen, a plurality of means carried thereby and projected within the path of movement of said shield or back plate sections respectively, an extension projecting from the bottom of each of said sections having a narrow bearing surface, a recessed support for each of said extensions whereby it is independently supported so that it will receive an initial movement from the force of the impact of a bullet therewith and will have subsequent movement independently of the force of such impact to develop sufficient force to actuate said actuating means, whereby said projector will be stopped to change the moving image to a still image substantially simultaneously with the impact of a bullet with the screen, and means independent of said actuating means for limiting the movements of said sections respectively to that required to operate said means for controlling said projector.

13. A cinematograph target apparatus embodying therein a screen, a projector adapted to direct moving images upon said screen, a shield or back plate positioned rearwardly of said screen, comprising a plurality of independently movable sections, illuminating means arranged intermediate said shield or back plate and said screen whereby the passage of a bullet through said screen will permit light rays from said illuminating means to indicate the point of impact of a bullet with the screen, means whereby said projector may be controlled, actuating means for said projector, controlling means common to all the sections of said screen, a plurality of means carried thereby and projected within the path of movement of said shield or back plate sections respectively, an extension projecting from the bottom of each of said sections having a narrow bearing surface, a recessed support for each of said extensions whereby it is independently supported so that it will receive an initial movement from the force of the impact of a bullet therewith and will have subsequent movement independently of the force of such impact to develop sufficient force to actuate said actuating means, whereby said projector will be stopped to change the moving image to a still image substantially simultaneously with the impact of a bullet with the screen, a fixed yoke straddling the edge of each of said sections whereby movement of said sections is limited to that necessary to actuate said projector, controlling means and adjustment means carried by each of said yokes and engaging the forward edge of each of said sections whereby the position of each of said sections may be adjusted to determine the force of the impact necessary to impart initial movement thereto.

14. A cinematograph target apparatus embodying therein a screen, a projector adapted to direct moving images upon said screen, a back plate or shield movable under the impact of a bullet therewith arranged rearwardly of said screen, means whereby said projector is stopped to change said moving image to a still image substantially simultaneously with the impact of a bullet with said screen, operative connection between said back plate or shield and said means, and automatically acting means whereby said projector is again made operative to direct moving images upon said screen after the lapse of a brief interval and said back plate or shield is substantially simultaneously restored to normal.

15. A cinematograph target apparatus embodying therein a screen, a projector adapted to direct moving images upon said screen, a physically movable shield or back plate positioned rearwardly of said screen, illuminating means arranged intermediate said shield or back plate and said screen whereby the passage of a bullet through said screen will permit light rays from said illuminating means to indicate the point of impact of a bullet with the screen, projector controlling means, actuating means for said projector controlling means, arranged within the path of movement of said shield or back plate, said shield or back plate being so supported that it will receive an initial movement from the force of the impact of a bullet therewith and will have subsequent movement to develop sufficient force independently of the force of such impact to actuate said means, whereby said projector will be stopped to change a moving image to a still image, substantially simultaneously with the impact of a bullet with the screen, and automatically acting means operatively connected with the said actuating means whereby said shield or back plate is restored to normal and the projector controlling means is simultaneously actuated to change a still image to a moving image.

16. A cinematograph target apparatus embodying therein, a roll support, a roll of continuous web or strip carried by said support, feeding means for drawing said web or strip from said roll through the apparatus, a plurality of guides whereby said web or strip is caused to pass the front of the apparatus in substantially parallel, adjacent reaches, the front reach forming a screen surface and the rearward reach forming a backing strip for said front reach, illuminating means rearwardly of said guides whereby the passage of a bullet through both said web reaches will permit the light from said means to indicate the point of impact of the bullet with the screen reach, means actuating said feeding means whereby continuous travel at a substantially uniform rate and in opposite directions is imparted to said web or strip reaches to cause the bullet openings therein respectively to be gradually and automatically moved out of register, a projector adapted to direct moving images upon said screen reach, a physically movable shield or back plate positioned rearwardly of said screen and said illuminating means, projector controlling means and actuating means for said projector controlling means, arranged within the path of movement of said shield or back plate, said shield or back plate being so supported that it will receive an initial movement from the force of the impact of a bullet therewith and will have subsequent movement to develop sufficient force independently of the force of such impact to actuate said means, whereby said projector will be stopped to change a moving image to a still image, substantially simultaneously with the impact of a bullet with the screen.

17. A cinematograph target apparatus embodying therein a roll support, a roll of continuous web or strip carried by said support, feeding means for drawing said web or strip from said roll through the apparatus, a plurality of guides whereby said web or strip is caused to pass the front of the apparatus in substantially parallel, adjacent reaches, the front reach forming a screen surface and the rearward reach forming a backing strip for said front reach, illuminating means rearwardly of said guides whereby the passage of a bullet through both said web reaches will permit the light from said means to indicate the point of impact of the bullet with the screen reach, means actuating said feeding means whereby continuous travel at a substantially uniform rate and in opposite directions is imparted to said web or strip reaches to cause the bullet openings therein respectively to be gradually and automatically moved out of register, a projector adapted to direct moving images upon said screen reach, a physically movable shield or back plate positioned rearwardly of said screen and said illuminating means, projector controlling means and actuating means for said projector controlling means, arranged within the path of movement of said shield or back plate, said shield or back plate being so supported that it will receive an initial movement from the force of the impact of a bullet therewith and will have subsequent movement to develop sufficient force independently of the force of such impact to actuate said means, whereby said projector will be stopped to change a moving image to a still image, substantially simultaneously with the impact of a bullet with the screen, and automatically acting means operatively connected with said actuating means whereby said shield or back plate is restored to normal and the projector controlling means is simultaneously actuated to change a still image to a moving image.

18. A cinematograph target apparatus embodying therein a roll support, a roll of continuous web or strip carried by said support, feeding means for drawing said web or strip from said roll through the apparatus, a plurality of guides whereby said web or strip is caused to pass the front of the apparatus in substantially parallel, adjacent reaches, the front reach forming a screen surface and the rearward reach forming a backing strip for said front reach, illuminating means rearwardly of said guides whereby the passage of a bullet through both of said web reaches will permit the light from said means to indicate the point of impact of the bullet with the screen reach, means actuating said feeding means whereby continuous travel at a substantially uniform rate and in opposite directions is imparted to said web or strip reaches to cause the bullet openings therein respectively to be gradually and automatically moved out of register, a projector adapted to direct moving images upon said screen reach, means whereby, substantially simultaneously with the impact of the bullet with said web, said projector will be stopped to change the moving image to a still image, and manually operative means whereby the actuating means for said web or strip feeding means may be made inoperative to prevent the openings in said screen reach and said backing strip reach passing out of register.

19. A cinematograph target apparatus embodying therein a screen, a projector adapted to direct moving images upon said screen, a physically movable shield or back plate positioned rearwardly of said screen, illuminating means arranged intermediate said shield or back plate and said screen whereby the passage of a bullet through said screen will permit light rays from said illuminating means to indicate the point of impact of a bullet with the screen, projector controlling means, actuating means for said projector controlling means, arranged within the path of movement of said shield or back plate, said shield or back plate being so supported that it will receive an initial movement from the force of the impact of a bullet therewith and will have subsequent movement to develop sufficient force independently of the force of such impact to actuate said means, whereby said projector will be stopped to change a moving image to a still image, substantially simultaneously with the impact of a bullet with the screen, a mechanical counter and operative connections between said actuating means and said counter whereby said counter will be operated with each actuation of said means.

20. A cinematograph target apparatus embodying therein a screen, a projector adapted to direct moving images upon said screen, an electric circuit, an electrical switch arranged in said circuit, an electro-receptive device whereby said projector may be stopped, arranged in said circuit, a physically movable shield or back plate positioned rearwardly of said screen, illuminating means arranged intermediate said shield or back plate and said screen whereby the passage of a bullet through said screen will permit light rays from said illuminating means to indicate the point of impact of a bullet with the screen, movable means arranged within the path of movement of said shield or back plate, said shield or back plate being so supported that it will receive an initial movement from the force of the impact of a bullet therewith, and will have subsequent movement independently of the force of such impact to develop sufficient force to actuate said movable means, a second electrical circuit, an electro-receptive device and a switch included in said second circuit, an oscillatory lever and operative connections between said lever, said movable means, both of said switches and said last named electro-receptive devices whereby with the movement of said shield or back plate said circuit to said first named electro-receptive device will be opened and stopped to project and change the moving image to a still image substantially simultaneously with the impact of the bullet with the screen and thereafter said last named circuit will be closed and actuate said last named electro-receptive device and cause said first named circuit to be automatically closed and said shield or back plate to be automatically restored to its normal position through said lever and said movable means.

21. A cinematograph target apparatus embodying therein a screen, a projector adapted to direct moving images upon said screen, a back plate or shield movable under the impact of a bullet therewith arranged rearwardly of said screen, means whereby said projector is stopped to change said moving image to a still image substantially simultaneously with the impact of a bullet with said screen, operative connections between said back plate or shield and said means, automatically acting means whereby said projector is again made operative to direct moving images upon said screen after the lapse of a brief interval, and said back plate or shield is substantially simultaneously restored to normal and manually operative means whereby said projector may be stopped and started independently of said first named means and said automatically acting means.

22. A cinematograph target apparatus embodying therein a roll support, a roll of continuous web or strip carried by said support, feeding means for drawing said web or strip from said roll through the apparatus, a plurality of guides whereby said web or strip is caused to pass the front of the apparatus in substantially parallel, adjacent reaches, the front reach forming a screen surface and the rearward reach forming a backing strip for said front reach, illuminating means rearwardly of said guides whereby the passage of a bullet through both of said web reaches will permit the light from said means to indicate the point of impact of the bullet with the screen reach, means actuating said feeding means whereby continuous travel at a substantially uniform rate and in opposite directions is imparted to said web or strip reaches to cause the bullet openings therein respectively to be gradually and automatically moved out of register, a projector adapted to direct moving images upon said screen reach, means whereby, substantially simultaneously with the impact of the bullet with said web, said projector will be stopped to change the moving image to a still image, manually operative means whereby the actuating means for said web or strip feeding means may be made inoperative to prevent the openings in said screen reach and said backing strip reach passing out of register, automatically acting means whereby said projector is again made operative to direct moving images upon said screen reach after the lapse of a brief interval, and manually operative means whereby said projector may be stopped and started independently of said means whereby the projector is stopped substantially simultaneously with the impact of the bullet, and said automatically acting means.

In witness whereof I hereunto affix my signature in the presence of two subscribing witnesses, this 20th day of November, 1915.

FRANK W. WEEKS.

Witnesses:
F. T. WENTWORTH,
JUDITH PARDER.

DISCLAIMER.

1,197,567.—*Frank W. Weeks*, New York, N. Y. CINEMATOGRAPH TARGET APPARATUS. Patent dated September 5, 1916. Disclaimer filed August 7, 1919, by the assignee, by mesne assignments, *Animated Target Company, Inc.*

Enters this disclaimer

"To that part of the claim in said specification which is in the following words, to wit:

"14. A cinematographic target apparatus embodying therein a screen, a projector adapted to direct moving images upon said screen, a back plate or shield movable under the impact of a bullet therewith arranged rearwardly of said screen, means whereby said projector is stopped to change said moving image to a still image substantially simultaneously with the impact of a bullet with said screen, operative connection between said back plate or shield and said means, and automatically acting means whereby said projector is again made operative to direct moving images upon said screen after the lapse of a brief interval and said back plate or shield is substantially simultaneously restored to normal."

[*Official Gazette August 19, 1919.*]